United States Patent
Bonnema et al.

[11] Patent Number: 6,033,212
[45] Date of Patent: Mar. 7, 2000

[54] LAMP FOR DISPENSING VOLATILE SUBSTANCES

[76] Inventors: James Bonnema, 13 Stony Brook La., Middleton, Mass. 01949; Timothy Huber, 191 Commonwealth Ave., Boston, Mass. 02116; Steven Shapiro, 102 Queen Anne's Ct., Apt. 1, Weymouth, Mass. 02189; Wen Der Wang, 61 Faulkner Ave., Wilmington, Mass. 01887; Karl Winkler, 5 Lido La., Bedford, Mass. 01730

[21] Appl. No.: 09/236,803

[22] Filed: Jan. 25, 1999

[51] Int. Cl.[7] .......................... F23D 14/28; A01M 19/00
[52] U.S. Cl. ........................ 431/344; 422/306; 422/125; 239/139; 43/1; 43/129
[58] Field of Search ...................... 422/306, 125; 431/344; 43/1, 129; 362/180, 159; 239/135, 136, 34, 139, 129

[56] References Cited

U.S. PATENT DOCUMENTS

| | | | |
|---|---|---|---|
| 4,321,656 | 3/1982 | Gruver, Jr. ............................. | 362/180 |
| 5,359,801 | 11/1994 | Mattucci et al. ............................ | 43/1 |
| 5,700,430 | 12/1997 | Bonnema et al. ...................... | 422/125 |
| 5,744,106 | 4/1998 | Eagle ...................................... | 422/306 |
| 5,928,605 | 7/1999 | Bonnema et al. ................... | 422/125 X |

*Primary Examiner*—Larry Jones
*Attorney, Agent, or Firm*—Levisohn, Lerner, Berger & Langsam

[57] ABSTRACT

A lamp having a hydrocarbon fuel source is provided. The lamp includes a housing and a fuel source containing hydrocarbon fuel. A mantle is disposed inside the housing and is in communication with the exit of the fuel source. A cover is attached to the housing in thermal communication with the interior housing. The cover has a slot and a replaceable pad is disposable in the slot; the pad preferably contains a volatilizable substance. When the fuel egresses the fuel source and is ignited and burns, heat generated from the fuel is conducted through the cover to the pad so that the volatilizable substance is volatilized. The volatilizable substance is preferably an insect repellent. The lamp may be portable such as a flashlight. A separately attachable cover that may retrofit an existing lamp is also provided.

28 Claims, 6 Drawing Sheets

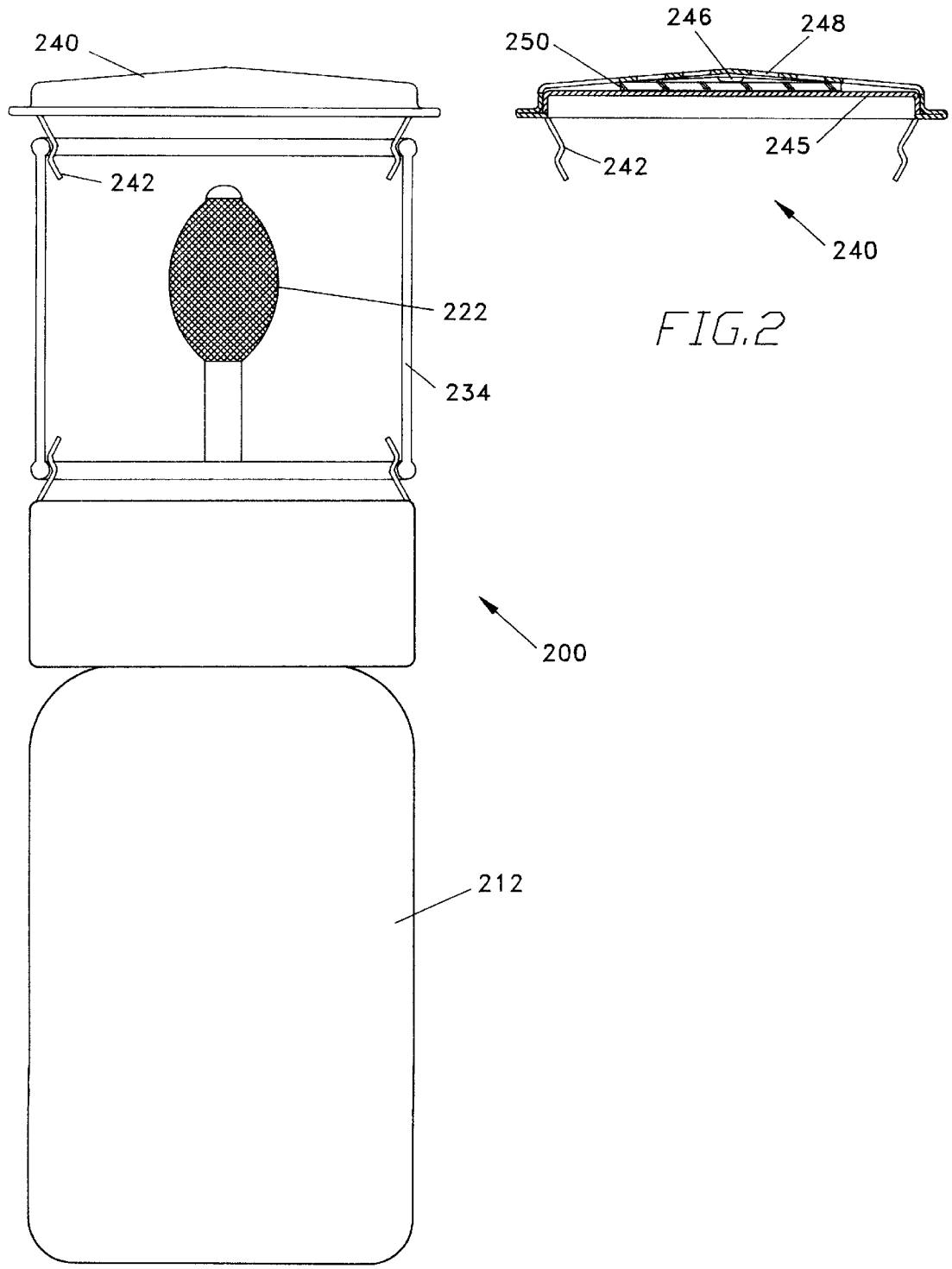

6,033,212

LAMP FOR DISPENSING VOLATILE SUBSTANCES

BACKGROUND OF THE INVENTION

1. Field of the Invention

The present invention relates generally to lamps and more particularly to lamps that use fossil or hydrocarbon fuels. The invention also relates to devices for dispensing volatile substances.

2. Description of Related Art

Portable lamps, lanterns, and flashlights that use hydrocarbon or fossil fuels such as butane are known. One such type of lamp is described in U.S. Pat. No. 3,843,311 to Nelson and U.S. Pat. No. 4,321,656 to Gruver, Jr., the teachings of both of which are incorporated by reference herein. This type of lamp generally has a fuel source such as a compartment or container that holds fuel in a liquid or gaseous state. When it is desired to use the lamp, either a person may provide a localized flame source (e.g., a match) to an exit port of the fuel to ignite the fuel, or the lamp may be provided with an internal igniter such as that described in U.S. Pat. No. 3,843,311 (e.g., a piezoelectric igniter). Because of their ease of use and portability, these lamps are commonly used for camping and other outdoor-related activity where access to electricity is significantly limited. Portable flashlights of this nature are described in U.S. Pat. No. 4,975,044 to Diederich and U.S. Pat. No. 4,475,882 to Gruner, the teachings of both of which are incorporated by reference herein.

In such outdoor environments, there is generally no protection from mosquitos and other insects. For example, if a person is camping or performing work in an outdoor setting, the person is subject to being bitten by insects, an often painful and sometimes dangerous process. Moreover, it is known that insects are commonly attracted to light sources. Thus, the use of a portable lamp or lantern in an outdoor setting may exacerbate the insect problem.

A variety of portable devices for dispensing volatile substances into the air are available. Such volatile substances most commonly are either insect control active ingredients or air treatment materials, such as air fresheners. Many of these portable devices utilize a battery-powered fan to evaporate volatilizable materials, without the use of heat.

Devices that utilize heat to evaporate or volatilize an active ingredient or other volatile substance are also well known in the art. However, many of these devices require access to house current or the like for the electrical power required to energize the heater. Consequently, the devices are not portable beyond the length of their power cords from the electrical receptacle into which they must be plugged.

Flames are another common source of heat for dispensing volatile substances. For example, scented candles and lighted wicks of various sorts underneath potpourri kettles are traditional devices for air freshening or air scenting. Citronella candles are an example of the same technique applied to insect control. Similarly, mosquito coils use combustion heat to volatilize or otherwise distribute insect control active ingredients into the area surrounding the device. A mosquito coil is a structure of punk or other slow-burning material that is either self-supporting or that is printed onto a substrate. The punk is lighted at one end to slowly burn, like incense, distributing with its smoke or by volatilization an insect control ingredient.

Other devices burn liquid fuel, most commonly alcohol, to generate heat for vaporizing insect control active ingredients. The device distributed by La Reina Enterprises of Falmouth, Mass. under the name "Skeeter Eater" evaporates insect repellent from an impregnated pad by heating the pad with a hot metal catalyst mesh fueled with alcohol. Similar products, sometimes using a simple alcohol flame instead of a metal catalyst mesh, are sold in Europe and Japan by other companies. The insect repellent pads of the Skeeter Eater device are flat and rectangular. The device has a flat bed, which is bridged over by a grid. A user slides a repellent pad onto the bed from an opening at one side of the grid and may retrieve it from a comparable opening at the opposite side of the bed. The liquid fuel devices generally require a user to pour fuel prior to using the device, with the consequent danger of spilling flammable liquids. Such spillage presents both a fire hazard and a mess, especially in devices that are lit with a match or other open flame.

Although these devices and methods exist in the art, being referred to by way of example only, the art is still in need of a safe and easy to use device that is not limited by the need to be plugged into an electrical receptacle, being instead entirely portable for use at any location desired. The art is also still in need of a combustion-heated device for volatilizing an active ingredient where that device requires no unguarded or accessible flame that could ignite flammable materials in the area and also operates with the adjustability, cleanliness, freedom from odor, and reliability associated with electrical devices.

U.S. Pat. No. 5,700,430 to Bonnema et al. and assigned to the same assignee as is the present invention overcomes a number of the deficiencies in the art, and its teachings are incorporated by reference herein. The Bonnema et al. patent describes a butane-using device for dispensing a volatile substance that heats a pad impregnated with insect repellent or the like in a manner much safer than the above-referenced Skeeter Eater. However, the device does not produce any light, and the use of a hydrocarbon-powered lamp in conjunction with the Bonnema et al. device requires two devices that use butane simultaneously, a scenario that inefficiently wastes butane and creates an unnecessarily large quantity of waste heat. Furthermore, unless the Bonnema et al. device is placed close to the light source, insects may still be attracted to the light source.

SUMMARY OF THE INVENTION

Accordingly, it is an object of the invention to provide a portable lamp that can repel insects.

It is another object of the invention to provide a hydrocarbon lamp that can repel insects.

It is another object of the invention to provide a device for dispensing volatile substances that does not generate unnecessary waste heat.

It is another object of the invention to provide a device for dispensing volatile substances that can be used as a light source.

It is another object of the invention to provide an insect repellent device that can be used as a light source.

The above and other objects are accomplished by the invention, which is a lamp having a hydrocarbon fuel source. The lamp includes a housing and a fuel source containing hydrocarbon fuel. A mantle is disposed inside the housing and is in communication with the exit of the fuel source. A cover is attached to the housing in thermal communication with the interior housing. The cover has a slot and a replaceable pad is disposable in the slot; the pad preferably contains a volatilizable substance. When the fuel egresses the fuel source and is ignited and burns, heat generated from the fuel is conducted through the cover to the pad so that the volatilizable substance is volatilized. The volatilizable substance is preferably an insect repellent. The lamp may be portable, e.g., a flashlight.

The invention also includes a device for dispensing a volatile substance to be used in conjunction with a lamp having a hydrocarbon fuel source, the lamp having a housing and a mantle disposed inside the housing. The device includes a cover attachable to the housing in thermal communication with an interior of the housing. The cover has a slot and a replaceable pad disposable in the slot. The pad contains a volatilizable substance. When fuel egresses the fuel source and is burned inside the mantle, waste heat generated from the fuel is conducted through the cover to the pad so that the volatilizable substance is volatilized.

In any of the above embodiments, the cover preferably includes a flat plate disposed beneath the slot. The pad rests on the plate when the pad is disposed in the slot. The cover is preferably made of metal for purposes of enhanced thermal conductivity, and the volatilizable substance is preferably insect repellent. The cover preferably includes a protrusion, disposed on an upper surface of the slot projecting downwardly towards the plate. The protrusion biases the pad against the plate when the pad is disposed in the slot.

The invention also includes a method of dispensing a volatile substance. A lamp that produces waste heat when operating is provided. A pad containing a volatilizable substance is disposed in thermal communication with the waste heat. The waste heat is utilized to raise the temperature of the pad, causing the volatilizable substance to be volatized.

BRIEF DESCRIPTION OF THE DRAWINGS

FIG. 2 is a sectional view of a cover, attachable to a lamp, according to the present invention.

FIG. 3 is a perspective view of the cover of FIG. 2 attached to a conventional lamp.

DETAILED DESCRIPTION OF THE PREFERRED EMBODIMENTS

Figure 1:
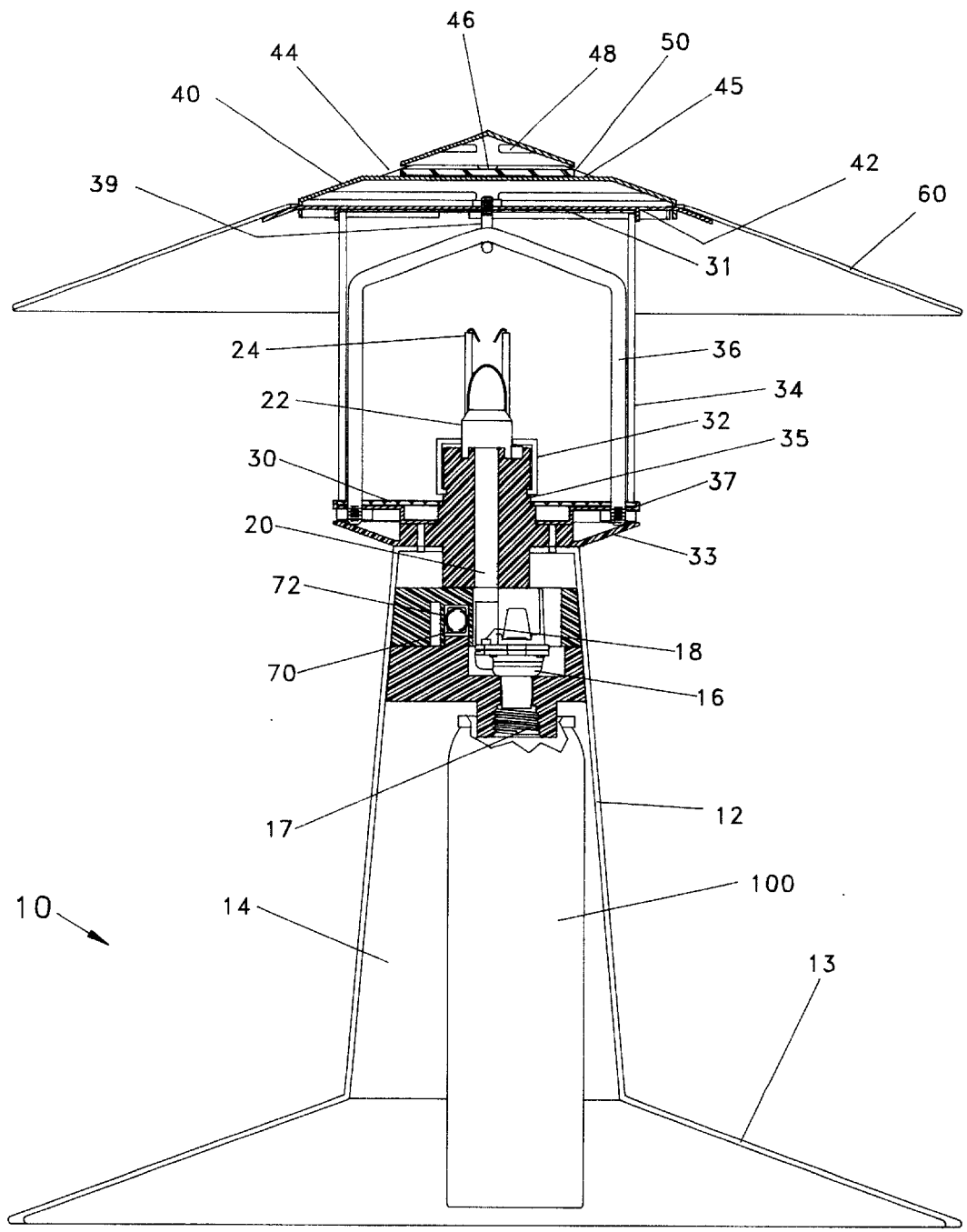
FIG. 1 is a part sectional, part perspective view of a lamp according to the present invention.
Figure 4:
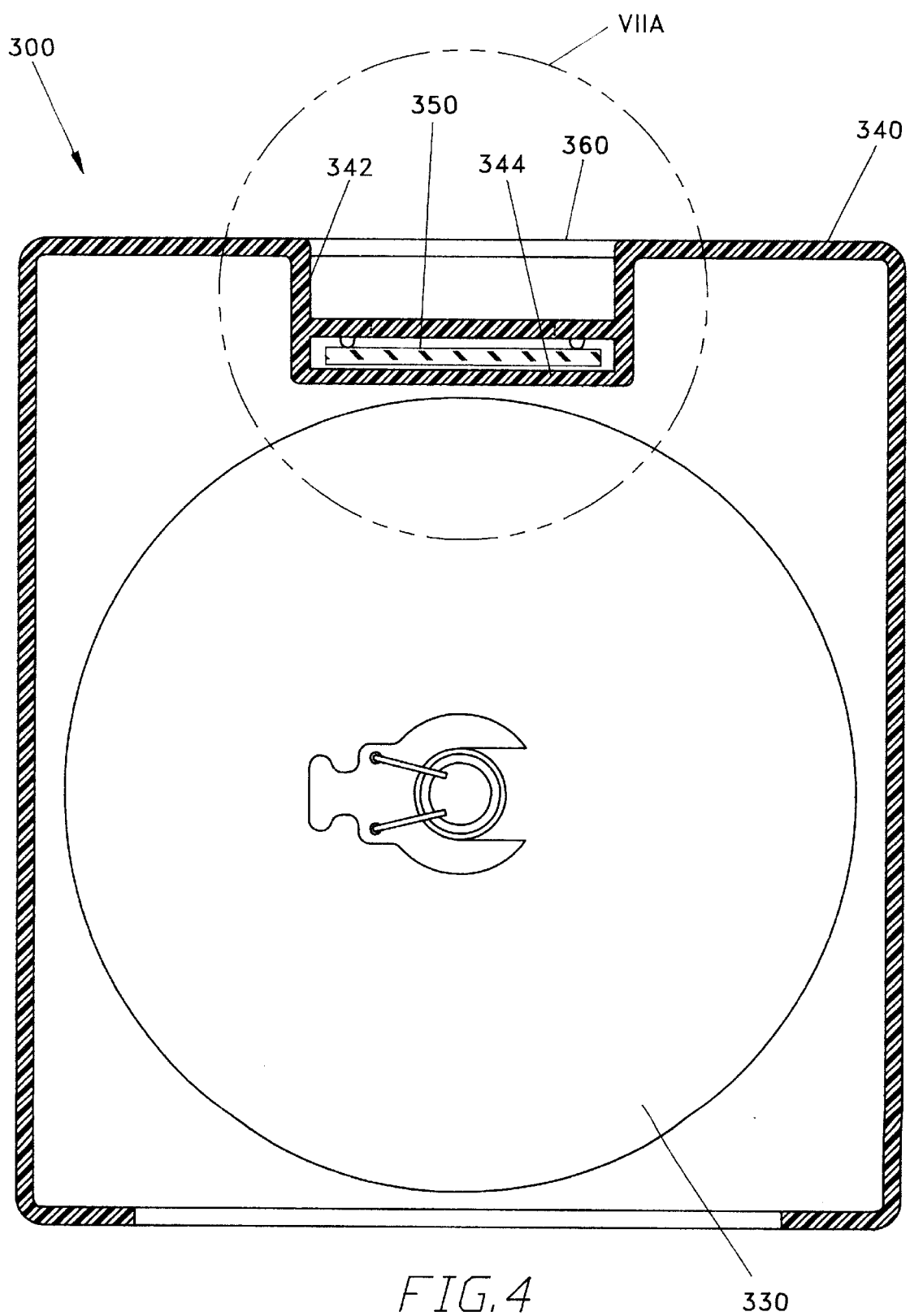
FIG. 4 is a partial sectional diagram of another embodiment of the invention.
Figure 5:
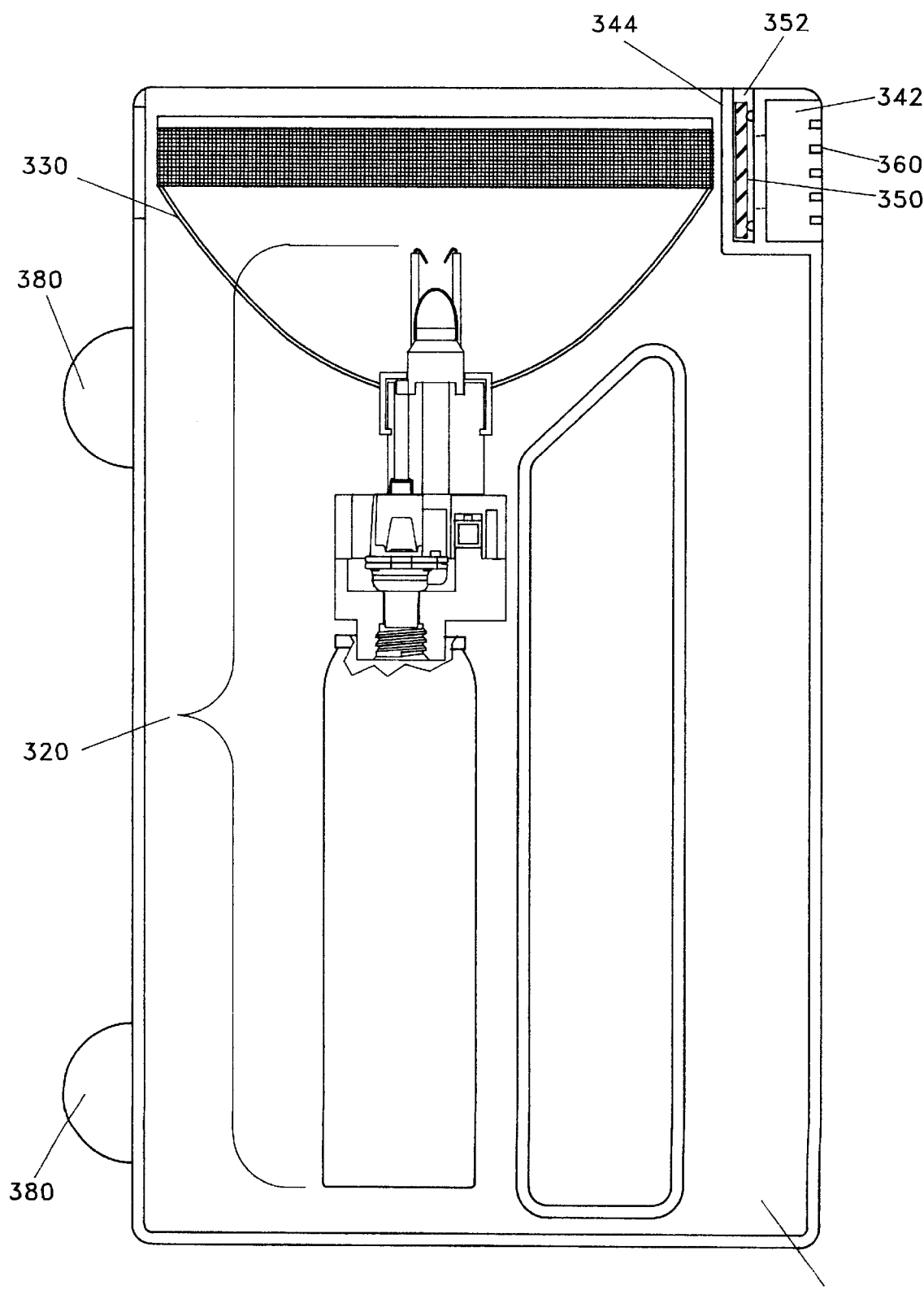
FIG. 5 is a side view of the internal components of the embodiment of FIG. 4.
Figure 6:
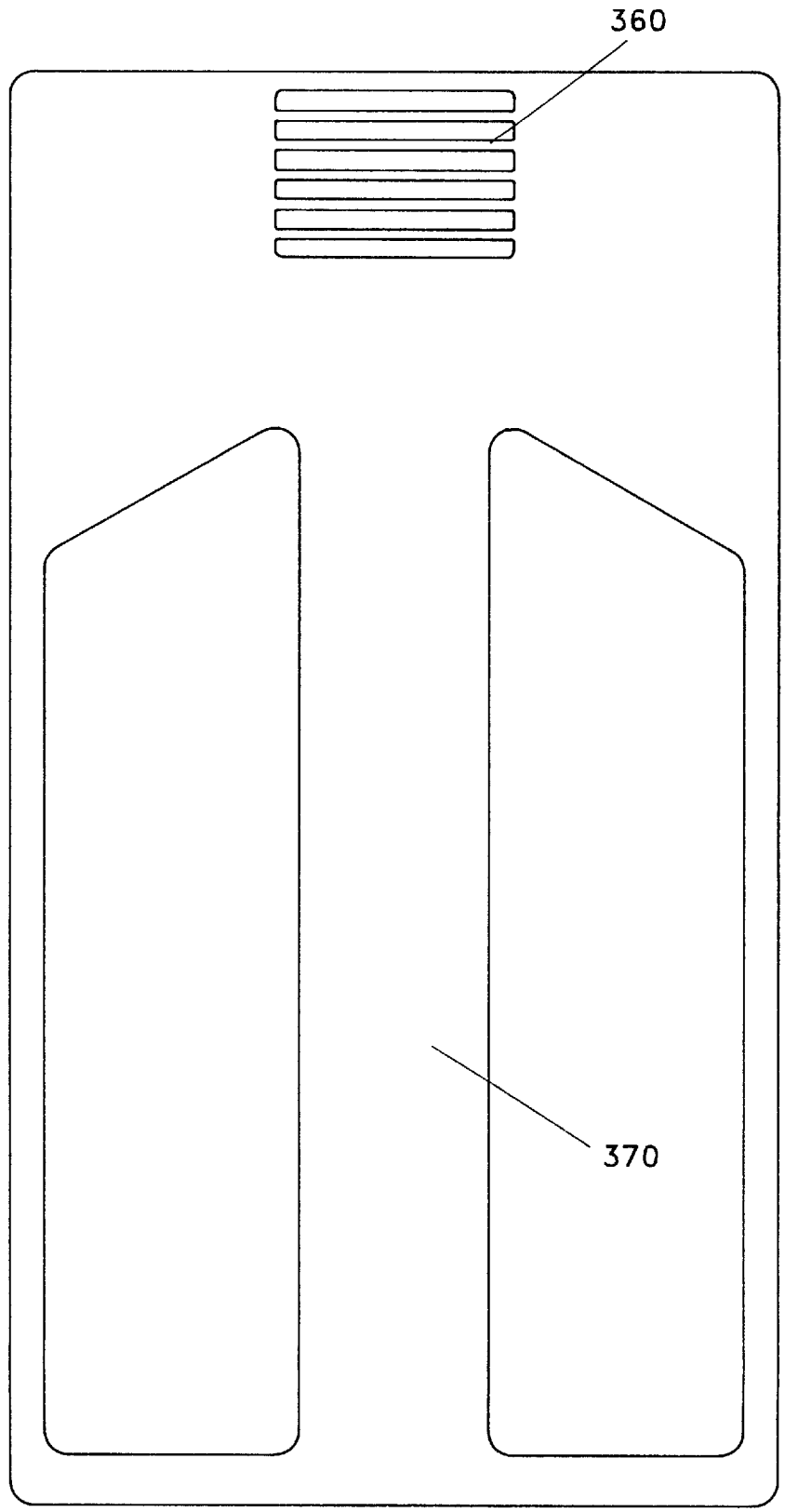
FIG. 6 is a top view of the exterior of the embodiment of FIG. 4.

Description will now be given with reference to FIGS. 1 and 2. As shown in the figures, lamp 10 includes housing 12 having base 13. Base 13 may be hollow and may preferably be weighted to provide increased stability for lamp 10. Housing 12 is at least partially hollow and is provided with recess 14. A fuel cartridge 100 typically contains a gaseous or liquid fuel such as butane or propane, and fits into recess 14 of housing 12. The fuel cartridge is meant to be replaceable. Threads 17 may be provided in recess 14 to mate with threads on cartridge 100 to lock the cartridge in place. Alternatively, instead of receiving a pre-filled fuel cartridge, housing 12 may be provided with a fillable fuel chamber (not shown) into which fuel would be added.

A flow control device 16, which in this example is a single stage pressure regulator, is in communication with the opening in cartridge 100 when the cartridge is in place in recess 14. Flow control device 16 regulates the flow of fuel from fuel cartridge 100 to the rest of the appliance. In some cases, the mere attachment of fuel cartridge 100 initiates the flow of fuel from the cartridge through flow control device 16. In other cases, a valve (not shown) may be opened manually by the user. In either event, when fuel pressure has built up to a certain level, fuel passes through flow control device 16 and exits from a small opening in gas jet 18. The opening in gas jet 18 is preferably 60–80 micrometers in diameter. Gas jet 18 is in communication with the entrance of venturi tube 20, however it is not sealingly engaged with venturi tube 20. That is, the entrance of venturi tube 20 is open and exposed to air in housing 12, so that when fuel from gas jet 18 enters the venturi tube, air is entrained along with the fuel to produce a fuel/air mixture that enters venturi tube 20.

Venturi tube 20 channels the fuel/air mixture to a gas mantle 22 disposed in globe 34 connected to housing 12. Spark electrodes 24 are provided near gas mantle 22 in globe 34. Button 70, biased by spring 72, is provided to allow the user of the lamp to activate the spark electrodes 24. When fuel leaves the cartridge 100 and when the spark electrodes 24 are activated via depression of button 70, the fuel is ignited and burns in the vicinity of the mantle 22, causing the mantle to incandesce as known in the art. What is not known in the art is the utilization of the heat produced from the combustion of the fuel, which will be described in detail below. The starter button 70 may preferably include a piezoelectric starting mechanism (not shown) that is known in the art.

Globe 34 is preferably cylindrical and is made transparent, translucent, frosted, or at least partially light-transmissible so that light generated by the incandescing of the mantle 22 can be utilized. Globe 34 may be made of glass, Pyrex, plastic, or any known heat-resistant material that can be made at least partially light-transmissible.

Globe 34 rests atop globe mount 33. As shown, globe mount 33 is, in the preferred embodiment, an inverted frusto-conical piece disposed atop housing 12. Preferably, globe mount 33 is fabricated from plastic that is more resistant to heat than that of housing 12, because the globe mount is closer to the source of combustion than is housing 12. Globe frame 37 is provided on the bottom of globe 34; globe frame 37 is fastened to bail 36, which serves to secure the top of the globe to the bottom of the globe, as will be explained further below.

Projecting upwards from housing 12 and globe mount 33 is mantle platform 35, a cylindrical projection that surrounds venturi tube 20 and provides a mounting surface for mantle 22. Mantle 22 is secured to mantle platform 35 by means of mantle clip 32. Mantle platform 35 includes electrical wiring (not shown) that connects spark electrodes 24 to starter button 70 and the ignition mechanism (not shown) associated therewith. In a preferred embodiment, electrical connectors are embedded in the plastic structure of mantle platform 35, while spark electrodes are integrally attached to mantle clip 32. When mantle clip 32 is secured properly onto mantle platform 35, the electrical wiring embedded in mantle platform 35 aligns and connects with spark electrodes 24.

Upper and lower ends of globe 34 are closed with wire screens 30 and 31, which serve as flame arresters for the ignition and combustion processes. Typically, conventional lamps of this type are ignited by inserting a lit match from outside the lamp. Moreover, conventional gas lanterns allow flame to travel freely from the lantern to the environment, and vice versa. By providing a self-contained igniter and flame arresters, the invention is safe and easy to use.

A cover 40, preferably made of metal, is secured to the top of globe 34. In a preferred embodiment, a bottom surface of cover 40 is secured to bail 36 via hook 39, which is threaded into a hole in the bottom of cover 40. The bottom portion of cover 40 is in thermal communication with globe 34, so that heat generated during the combustion of fuel in the globe is transmitted to cover 40. Slot 44 is formed through cover 40, preferably in a horizontal plane parallel to the bottom of base 13 of housing 12. The formation of slot 44 creates a flat surface 45 immediately below slot 44. Slot 44 is provided to accept a replaceable pad 50 which is disposable in slot 44 and rests on surface 45. Because cover 40 is in thermal communication with the interior of globe 34, when fuel is combusted and waste heat is generated, the heat will be transmitted to cover 40 and surface 45 will heat up. A biasing detent 46 is provided in slot 44 hanging above surface 45 which presses a pad 50 firmly against surface 45. Cover 40 is provided with air vents 48 to allow excess waste heat to escape.

Pad 50 contains or is impregnated with a volatilizable substance such as insect repellent which vaporizes when the pad is heated. Thus, when the lamp is activated, waste heat from the combustion process causes surface 45 to warm, which causes the volatilizable substance in the pad to be released. Biasing detent 46 is provided to ensure good contact between pad 50 and surface 45 to thereby maximize the amount of heat transferred to pad 50 via conduction from surface 45.

Secured between cover 40 and globe 34 is a screen frame and shade support 42. Lamp shade 60 is disposed about shade support 42 and functions as a conventional lamp shade.

In operation, the invention works as follows. A replaceable pad 50 containing a volatilizable substance is inserted into slot 44 and a replaceable cartridge 100 is inserted into recess 14 of housing 12. Pressure regulator 16 is opened and fuel is allowed to travel up venturi tube 20 to mantle 22. The user depresses button 70 which causes a spark to jump across spark electrodes 24. The spark ignites the fuel which burns in the vicinity of the mantle 22, causing the mantle to incandesce. The lamp thereby gives off light. Simultaneously, the waste heat generated by the combustion of the fuel near mantle 22 heats up surface 45 of cover 40, thereby heating pad 50. As the temperature of pad 50 rises, the volatilizable substance impregnated therein is released into the ambient atmosphere. In this way, insect repellent, for example, may be dispensed in a safe and convenient fashion in an outdoor setting, such as on a camping trip or at a barbecue. Excess waste heat is allowed to exit from the lamp via vents 48.

In another embodiment, the invention includes a separate cover for converting a conventional gas lamp or lantern to a device for dispensing volatile substances. FIGS. 2–3 show the inventive cover adapter 240 which is attachable to conventional lamp 200. Cover adapter 240 has biasing clips 242 which fit inside the upper rim of globe 234 of conventional lamp 200 (see FIG. 3). Cover adapter 240 has a heating plate 245 and a biasing detent 246 similar to heating surface 45 and biasing detent 46 of cover 40 in FIG. 1. Air vents 248 allow excess waste heat to escape lamp 200.

In operation, the inventive cover adapter works as follows. Fuel issuing from housing 212 is ignited and burns on or near mantle 222, while cover 240 is disposed on the upper rim of globe 234. The heat produced from the combustion of the fuel heats up heating plate 245, which transmits the heat to pad 250. A volatilizable substance impregnated in pad 250 is vaporized, and excess waste heat leaves via air vents 248.

A third embodiment is shown in FIGS. 4–7B which depict a portable version of the inventive lamp, e.g., a flashlight. Flashlight 300, like lamp 10 and conventional lamp 200, is provided with a replaceable fuel cartridge, a venturi, a mantle, etc., which are collectively referenced as combuster/incandescer 320. The components of combuster/incandescer 320 function substantially similarly to those of lamps 10 and 200, and their description will not be repeated. Surrounding the mantle end of combuster/incandescer 320 is a reflector 330, which collimates light as in a conventional flashlight. Reflector 330 may be parabolic or any other convenient shape.

Figure 7A:
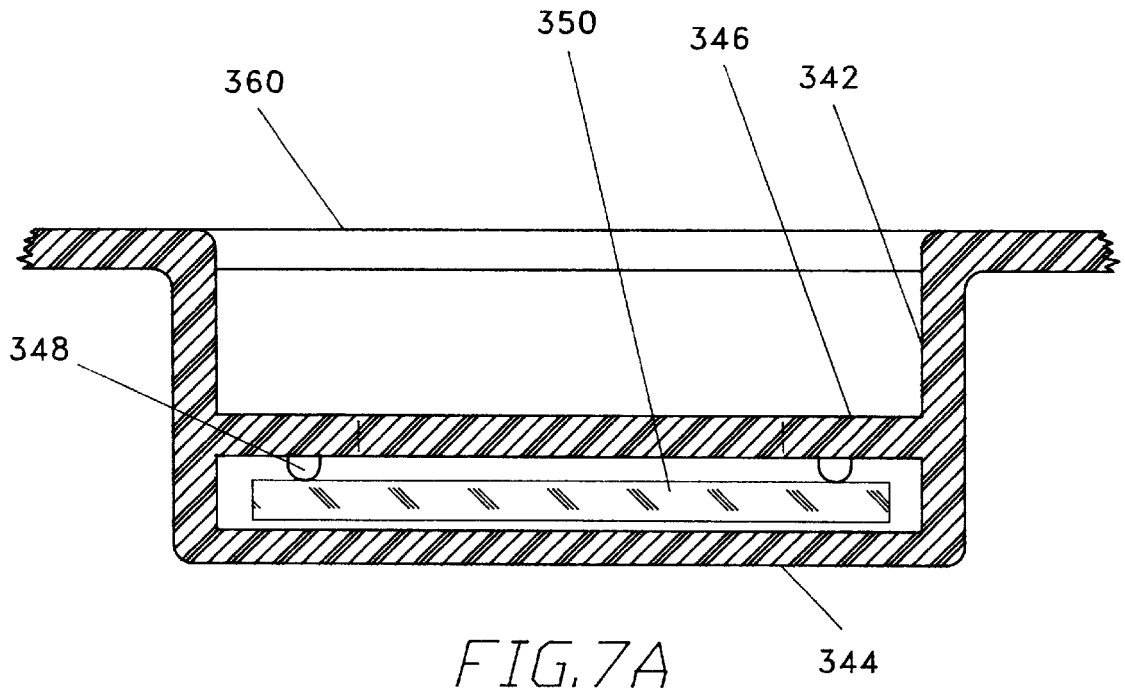
FIG. 7A is an enlarged view of detail VIIA in FIG. 4.
Figure 7B:
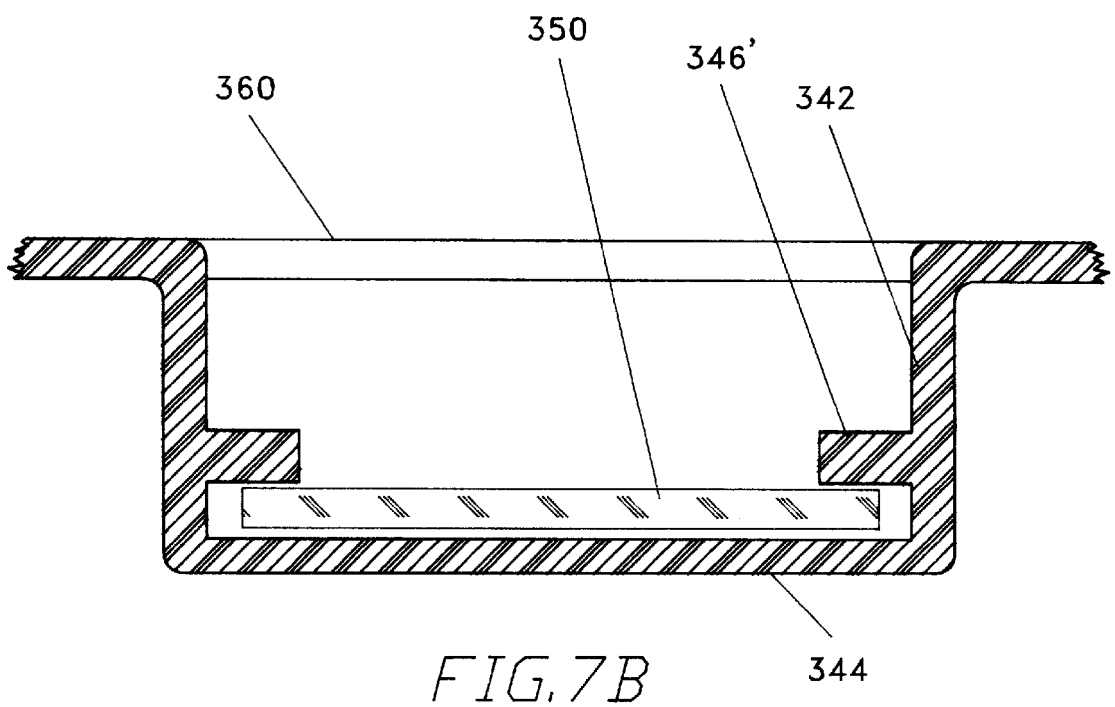
FIG. 7B is an alternate configuration of detail VIIA.

Flashlight 300 includes a housing 340 which is provided with a depression or recess 342. The bottom plate 344 of recess 342 is disposed close to reflector 330 so that heat generated by the mantle is easily conducted to plate 344. A replaceable pad 350 is disposable through a slot 352 in the housing; pad 350 rests atop plate 344. As best shown in FIGS. 7A–B, a securing structure may also be provided in recess 342. In one embodiment, the securing structure includes top plate 346 (FIG. 7A) and biasing detents 348. In another embodiment, as shown in FIG. 7B, rails 346' are provided which, with bottom plate 344, form channel or slot 349 into which pad 350 may be disposed. Although not shown, detents may be provided on the lower surfaces of rails 346' for the same purpose as in previous embodiments. Grill 360 is provided to allow material that was impregnated in pad 350 to waft around once volatized. Housing 340 may be provided with handle 370 and/or feet 380.

The invention is not limited to the description above but rather is determined by the appended claims. Variations on the invention are contemplated as being within the scope of the invention. For example, the cover is preferably constructed of metal, however any heat-resistant substance having good thermal conductivity may be employed. Also, the invention is not limited to a method and device for dispensing insect repellent; any volatile or volatilizable substance is contemplated, such as air freshener, asthma medication, and the like.

What is claimed is:

1. An insect-repelling lamp having a hydrocarbon fuel source, comprising:

a housing;

a fuel source containing hydrocarbon fuel and having an exit for said fuel;

a mantle disposed inside said housing and in communication with said exit of said fuel source;

a cover attached to said housing in thermal communication with said housing, said cover having a slot and a replaceable pad disposable in said slot, said pad containing a volatilizable insect repellent, said cover also having vents communicating between an interior of said housing and ambient air, and an ignition source, disposed inside said housing near said mantle, wherein when said fuel egresses said fuel source via said exit and when said ignition source is activated, said fuel is ignited and burns near said mantle causing said mantle to incandesce, and wherein when said fuel is burned waste heat generated from said fuel is conducted through said cover to said pad so that said volatilizable insect repellent is volatilized and insects are repelled, said cover allowing excess waste heat to leave via said vents thereby cooling said lamp.

2. A lamp according to claim 1, further comprising a pressure regulator in communication with said fuel source for controlling the release of said fuel.

3. A lamp according to claim 1, further comprising a passageway connecting said exit to said mantle.

4. A lamp according to claim 3, wherein said passageway further comprises a venturi tube.

5. A lamp according to claim 1, wherein a shape of said mantle coincides with a shape of a flame front of said fuel when said fuel is burning.

6. A lamp according to claim 1, wherein said ignition source comprises a pair of spark electrodes spaced apart near said mantle.

7. A lamp according to claim 6, wherein said ignition source further comprises a switch disposed on an exterior of said housing and electrically connected to said spark electrodes, wherein depression of said switch causes a spark to form across said spark electrodes.

8. A lamp according to claim 1, wherein said housing comprises a first section that is at least partially light-transmissible, said mantle being disposed in said first section.

9. A lamp according to claim 8, wherein said ignition source is disposed in said first section of said housing.

10. A lamp according to claim 8, wherein said first section comprises:
a clear structure having a first end and a second end; and
a screen disposed in said first end of said clear structure.

11. A lamp according to claim 10, wherein said cover is attached to said first end of said clear structure, said cover being in thermal communication with an interior of said housing.

12. A lamp according to claim 8, wherein said first section of housing comprises:
a clear structure having a first end and a second end; and
flame arresters disposed in said first and second ends of said clear structure.

13. A lamp according to claim 12, wherein said flame arresters comprise wire screens.

14. A lamp according to claim 1, wherein said cover includes a flat plate disposed beneath said slot, said pad resting on said plate when said pad is disposed in said slot.

15. A lamp according to claim 14, wherein said cover is made of metal and said clear structure is made of glass.

16. A lamp according to claim 14, said cover further comprising a protrusion, disposed on an upper surface of said slot projecting downwardly towards said plate, said protrusion biasing said pad against said plate when said pad is disposed in said slot.

17. A lamp according to claim 1, wherein said fuel source comprises a replaceable fuel cartridge disposable at least partially inside said housing.

18. A lamp according to claim 1, wherein said fuel comprises butane.

19. A lamp according to claim 1, wherein said lamp is portable.

20. A lamp according to claim 19, wherein said lamp comprises a flashlight.

21. A lamp according to claim 19, wherein said cover comprises a plate, integral with said housing, upon which said pad is disposable.

22. A lamp according to claim 21, further comprising a protrusion disposed above said plate and biasing downwardly towards said plate, said protrusion biasing said pad against said plate when said pad is disposed on said plate.

23. An insect-repelling lamp having a hydrocarbon fuel source, comprising:
a housing;
a fuel source contain hydrocarbon fuel and having an exit for said fuel;
a mantle disposed inside said housing and in communication with said exit of said fuel source; and
a cover attached to said housing in thermal communication with an interior of said housing, said cover having a slot and a replaceable pad disposable in said slot, said pad containing a volatilizable insect repellent, said cover also having vents communicating between an interior of said housing and ambient air,
wherein when said fuel egresses said fuel source via said exit and is ignited, said fuel burns near said mantle causing said mantle to incandesce, and wherein when said fuel is burned, waste heat generated from said fuel is conducted through said cover to said pad so that said volatilizable insect repellent is volatilized and insects are repelled, said cover allowing excess waste heat to leave via said vents thereby cooling the lamp.

24. A device for dispensing a volatile insect repellent to be used in conjunction with a lamp having a fuel source, the lamp having a housing and a mantle disposed inside the housing, comprising:
a cover attachable to the housing in thermal communication with an interior of the housing, said cover having a slot and a replaceable pad disposable in said slot, said pad containing a volatilizable substance, said cover also having vents communicating between an interior of the lamp housing and ambient air,
wherein when fuel egresses the fuel source and is burned near the mantle, waste heat generated from the fuel is conducted through said cover to said pad so that said volatilizable insect repellent is volatilized and insects are repelled, said cover allowing excess waste heat to leave via said vents thereby cooling the lamp.

25. A device according to claim 24, wherein said cover includes a flat plate disposed beneath said slot, said pad resting on said plate when said pad is disposed in said slot.

26. A device according to claim 25, wherein said cover is made of metal.

27. A device according to claim 25, said cover further comprising a protrusion, disposed on an upper surface of said slot projecting downwardly towards said plate, said protrusion biasing said pad against said plate when said pad is disposed in said slot.

28. A method of repelling insects and producing light comprising the steps of:
providing a lamp that produces waste heat when operating;
disposing a pad containing a volatilizable insect repellent in thermal communication with the waste heat;
utilizing the waste heat to raise the temperature of the pad, causing the volatilizable insect repellent to be volatilized and insects to be repelled; and
venting heat from the lamp via openings disposed near the pad.

* * * * *

REEXAMINATION CERTIFICATE (4818th)
United States Patent
Bonnema et al.

(10) Number: US 6,033,212 C1
(45) Certificate Issued: Jul. 22, 2003

(54) LAMP FOR DISPENSING VOLATILE SUBSTANCES

(75) Inventors: James Bonnema, Middleton, MA (US); Timothy Huber, Boston, MA (US); Steven Shapiro, Weymouth, MA (US); Wen Der Wang, Wilmington, MA (US); Karl Winkler, Bedford, MA (US)

(73) Assignee: Schawbel Corporation, Boston, MA (US)

Reexamination Request:
No. 90/006,121, Sep. 28, 2001

Reexamination Certificate for:
Patent No.: 6,033,212
Issued: Mar. 7, 2000
Appl. No.: 09/236,803
Filed: Jan. 25, 1999

(51) Int. Cl.[7] .................. F23D 14/28; A01M 19/00
(52) U.S. Cl. .................. 431/344; 422/306; 422/125; 239/139; 43/1; 43/129
(58) Field of Search ................. 431/346, 106; 392/393; 422/125

(56) References Cited

U.S. PATENT DOCUMENTS

| | | | |
|---|---|---|---|
| 1,230,342 A | | 6/1917 | Thornberg |
| 1,547,160 A | | 7/1925 | Bailey |
| 1,803,334 A | | 5/1931 | Lehmann |
| 2,263,659 A | * | 11/1941 | Tullis .................. 431/106 |
| 2,293,235 A | | 8/1942 | Zahner |
| 2,714,649 A | | 8/1955 | Critzer |
| 2,733,333 A | | 1/1956 | Peters |
| 2,742,342 A | | 4/1956 | Dew et al. |
| 2,817,882 A | * | 12/1957 | McGovern .................. 422/305 |
| 2,931,880 A | | 4/1960 | Yaffe |
| 2,942,090 A | | 6/1960 | Diehl |
| 3,175,601 A | * | 3/1965 | Knapp et al. .................. 431/106 |
| 3,248,530 A | | 4/1966 | Titmas |
| 3,780,260 A | | 12/1973 | Elsner |
| 3,941,554 A | * | 3/1976 | Curtis .................. 431/109 |
| 3,948,445 A | | 4/1976 | Andeweg |
| 4,781,895 A | * | 11/1988 | Spector .................. 422/306 |
| 4,839,144 A | | 6/1989 | Martin |
| 4,870,314 A | * | 9/1989 | Hefling .................. 431/255 |
| 5,095,647 A | | 3/1992 | Zobele et al. |
| 5,168,654 A | | 12/1992 | Chien |
| 5,647,052 A | | 7/1997 | Patel et al. |
| 5,840,246 A | | 11/1998 | Hammons et al. |
| 5,891,400 A | | 4/1999 | Ansari et al. |
| 5,902,100 A | * | 5/1999 | Long .................. 431/264 |
| 5,938,430 A | | 8/1999 | Majerowski |

* cited by examiner

*Primary Examiner*—Sara Clarke

(57) ABSTRACT

A lamp having a hydrocarbon fuel source is provided. The lamp includes a housing and a fuel source containing hydrocarbon fuel. A mantle is disposed inside the housing and is in communication with the exit of the fuel source. A cover is attached to the housing in thermal communication with the interior housing. The cover has a slot and a replaceable pad is disosable in the slot; the pad preferably contains a volatilizable substance. When the fuel egresses the fuel source and is ignited and burns, heat generated from the fuel is conducted through the cover to the pad so that the volatilizable substance is volatilized. The volatilizable substance is preferably an insect repellent. The lamp may be portable such as a flashlight. A separately attachable cover that may retrofit an existing lamp is also provided.

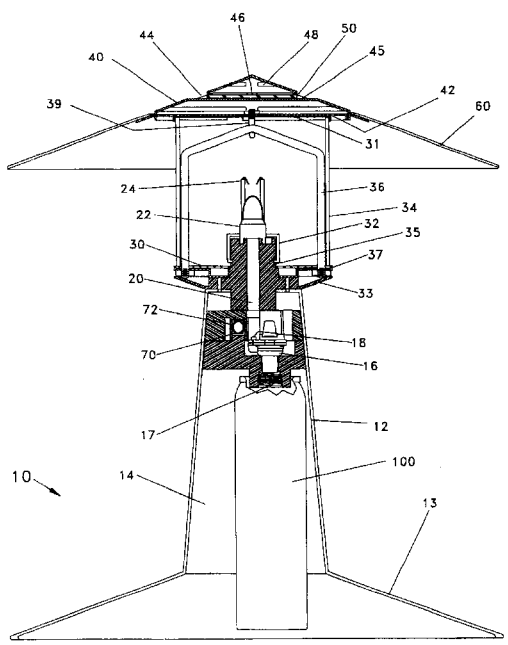

US 6,033,212 C1

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, line 58–Column 3, line 4:

The above and other objects are accomplished by the invention, which is a lamp having a hydrocarbon fuel source. The lamp includes a housing and a fuel source containing hydrocarbon fuel. A mantle is disposed inside the housing and is in communication with the exit of the fuel source. A cover is attached to the housing in thermal communication with the interior housing. The cover has a slot and a replaceable pad is disposable in the slot; the pad preferably contains a volatilizable substance. When the fuel egresses the fuel source and is ignited and burns, heat generated from the fuel is conducted through the cover to the pad so that the volatilizable substance is volatilized. The volatilizable substance is preferably an insect repellent. The lamp may be [portable] *hand-held*, e.g., a flashlight.

Column 6, lines 5–16:

A third embodiment is shown in FIGS. 4–7B which depict a [portable] *hand-held* version of the inventive lamp, e.g., a flashlight. Flashlight 300, like lamp 10 and conventional lamp 200, is provided with a replaceable fuel cartridge, a venturi, a mantle, etc., which are collectively referenced as combuster/incandescer 320. The components of combuster/incandescer 320 function substantially similarly to those of lamps 10 and 200, and their description will not be repeated. Surrounding the mantle end of combuster/incandescer 320 is a reflector 330, which collimates light as in a conventional flashlight. Reflector 330 may be parabolic or any other convenient shape.

AS A RESULT OF REEXAMINATION, IT HAS BEEN DETERMINED THAT:

Claims 14 and 25 are cancelled.

Claims 1, 15, 16, 23, 24, 26, 27 and 28 are determined to be patentable as amended.

Claims 2–13 and 17–22, dependent on an amended claim, are determined to be patentable.

1. An insect-repelling lamp having a hydrocarbon fuel source, comprising:
    a housing;
    a fuel source containing hydrocarbon fuel and having an exit for said fuel;
    a mantle disposed inside said housing and in communication with said exit of said fuel source;
    a cover attached to said housing in thermal communication with said housing, said cover having a slot and a replaceable pad disposable in said slot, said pad containing a volatilizable insect repellent, said cover also having vents communicating between an interior of said housing and ambient air, *said cover also including a flat plate disposed beneath said slot, said pad resting on said plate when said pad is disposed in said slot;* and
    an ignition source, disposed inside said housing near said mantle,
    wherein when said fuel egresses said fuel source via said exit and when said ignition source is activated, said fuel is ignited and [bums] *burns* near said mantle causing said mantle to incandesce, and wherein when said fuel is burned, waste heat generated from said fuel is conducted through said cover to said pad so that said volatilizable insect repellent is volatilized and insects are repelled, said cover allowing excess waste heat to leave via said vents thereby cooling said lamp.

15. A lamp according to claim [14] *1*, wherein said cover is made of metal and said clear structure is made of glass.

16. A lamp according to claim [14] *1*, said cover further comprising a protrusion, disposed on an upper surface of said slot projecting downwardly towards said plate, said protrusion biasing said pad against said plate when said pad is disposed in said slot.

23. An insect-repelling lamp having a hydrocarbon fuel source, comprising:
    a housing;
    a fuel source containing hydrocarbon fuel and having an exit for said fuel;
    a mantle disposed inside said housing and in communication with said exit of said fuel source; and
    a cover attached to said housing in thermal communication with an interior of said housing, said cover having a slot and a replaceable pad disposable in said slot, said pad containing a volatilizable insect repellent, said cover also having vents communicating between an interior of said housing and ambient air, *said cover including a flat plate disposed beneath said slot, said pad resting on said plate when said pad is disposed in said slot,*
    wherein when said fuel egresses said fuel source via said exit and is ignited, said fuel burns near said mantle causing said mantle to incandesce, and wherein when said fuel is burned, waste heat generated from said fuel is conducted through said cover to said pad so that said volatilizable insect repellent is volatilized and insects are repelled, said cover allowing excess waste heat to leave via said vents thereby cooling the lamp.

24. A device for dispensing a volatile insect repellent to be used in conjunction with a lamp having a fuel source, the lamp having a housing and a mantle disposed inside the housing, comprising:
    a cover attachable to the housing in thermal communication with an interior of the housing, said cover having a slot and a replaceable pad disposable in said slot, said pad containing a volatilizable substance, and cover also having vents communicating between an interior of the lamp housing and ambient air, *said cover including a flat plate disposed beneath said slot, said pad resting on said plate when said pad is disposed in said slot,*
    wherein when fuel egresses the fuel source and is burned near the mantle, waste heat generated from the fuel is conducted through said cover to said pad so that said volatilizable insect repellent is volatilized and insects are repelled, said cover allowing excess waste heat to leave via said vents thereby cooling the lamp.

26. A device according to claim [25] *24*, wherein said cover is made of metal.

27. A device according to claim [25] *24*, said cover further comprising a protrusion, disposed on an upper surface of said slot projecting downwardly towards said plate, said protrusion biasing said pad against said plate when said pad is disposed in said slot.

28. A method of repelling insects and producing light comprising the steps of:

provided a *portable* lamp that produces waste heat when operating;

*providing a cover to the lamp, the cover including a slot, a flat plate disposed beneath the slot, and openings;* disposing a pad containing a volatilizable insect repellent in *the slot in contact with the plate, the pad in* thermal communication with the waste heat;

utilizing the waste heat to raise the temperature of the pad, causing the volatilizable insect repellent to be volatilized and insects to be repelled; and venting *the waste* heat from the lamp via *the* openings [disposed near the pad] *in the cover*.

* * * * *